US012585946B2

(12) United States Patent
Luo et al.

(10) Patent No.: US 12,585,946 B2
(45) Date of Patent: Mar. 24, 2026

(54) HETEROGENEOUS TREE GRAPH NEURAL NETWORK FOR LABEL PREDICTION

(71) Applicant: Microsoft Technology Licensing, LLC, Redmond, WA (US)

(72) Inventors: Qinlong Luo, Alpharetta, GA (US); Mingyu Guan, Atlanta, GA (US); Jack Wilson Stokes, III, North Bend, WA (US); Purvanshi Mehta, Bellevue, WA (US); Elnaz Nouri, Seattle, WA (US); Fuchen Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

(21) Appl. No.: 18/192,993

(22) Filed: Mar. 30, 2023

(65) Prior Publication Data

US 2024/0330679 A1 Oct. 3, 2024

(51) Int. Cl.
*G06N 3/08* (2023.01)
*G06N 5/022* (2023.01)

(52) U.S. Cl.
CPC .............. *G06N 3/08* (2013.01); *G06N 5/022* (2013.01)

(58) Field of Classification Search
CPC .......... G06N 3/08; G06N 5/022; G06N 3/042; G06N 3/045; G06Q 10/04; G06Q 10/107; G06F 16/9024
See application file for complete search history.

(56) References Cited

U.S. PATENT DOCUMENTS 7,624,081 B2 * 11/2009 Zhao .................... G06F 16/951
706/20
9,087,303 B2 * 7/2015 Rinott .................... G06N 5/048
(Continued)

OTHER PUBLICATIONS

Fu, et al., "MAGNN: Metapath Aggregated Graph Neural Network for Heterogeneous Graph Embedding", Proceedings of The Web Conference, Apr. 20, 2020, pp. 2331-2341.
(Continued)

*Primary Examiner* — Bhavesh V Amin
(74) *Attorney, Agent, or Firm* — Holzer Patel Drennan

(57) ABSTRACT

A method for making predictions pertaining to entities represented within a heterogeneous graph includes: identifying, for each node in the heterogeneous graph structure, a set of node-target paths that connect the node to a target node; assigning, to each of the node-target paths identified for each node, a path type identifier indicative of a number of edges and corresponding edge types in the associated node-target path; and extracting a semantic tree from the heterogeneous graph structure. The semantic tree includes the target node as a root node and defines a hierarchy of metapaths that each individually correspond to a subset of the node-target paths in the heterogeneous graph structure assigned to a same path type identifier. The semantic tree is encoded, using one or more neural networks by generating a metapath embedding corresponding to each metapath in the semantic tree. Each of the resulting metapath embeddings encodes aggregated feature-label data for nodes in the heterogeneous graph structure corresponding to the path type identifier corresponding to the metapath associated with the metapath embedding. A label is predicted for the target node in the heterogeneous graph structure based on the set of metapath embeddings.

20 Claims, 7 Drawing Sheets

(56) References Cited

U.S. PATENT DOCUMENTS

| | | | | |
|---|---|---|---|---|
| 9,342,789 | B2 * | 5/2016 | Aharoni | G06N 20/00 |
| 10,902,208 | B2 * | 1/2021 | Xu | G06N 3/044 |
| 11,216,725 | B2 * | 1/2022 | Bouton | G06N 3/08 |
| 11,373,049 | B2 * | 6/2022 | Johnson Premkumar | |
| | | | | G06F 40/44 |
| 11,687,608 | B2 * | 6/2023 | Zihayat Kermani | G06N 5/022 |
| | | | | 707/769 |
| 11,709,806 | B2 * | 7/2023 | Alvarez-Melis | G06N 3/09 |
| | | | | 707/803 |
| 11,836,538 | B2 * | 12/2023 | Tamilselvam | G06F 16/285 |
| 11,854,671 | B2 * | 12/2023 | Rong | G16C 20/30 |
| 11,881,316 | B2 * | 1/2024 | Monaghan | G06N 20/20 |
| 11,934,390 | B2 * | 3/2024 | Tung | G06F 16/9024 |
| 12,147,791 | B1 * | 11/2024 | Bui | G06F 8/40 |
| 12,148,201 | B2 * | 11/2024 | Kroenke | G16H 30/40 |
| 12,417,402 | B2 * | 9/2025 | Monaghan | G06N 20/20 |
| 12,462,154 | B2 * | 11/2025 | Hou | G06F 18/213 |
| 2003/0172352 | A1 * | 9/2003 | Kashima | G06F 18/24323 |
| | | | | 707/E17.012 |
| 2014/0250032 | A1 * | 9/2014 | Huang | G06N 20/00 |
| | | | | 706/12 |
| 2017/0255878 | A1 * | 9/2017 | Fu | G06N 20/00 |
| 2018/0053097 | A1 * | 2/2018 | Soni | G06N 5/022 |
| 2018/0285738 | A1 * | 10/2018 | Bouton | G06N 3/09 |
| 2019/0020670 | A1 * | 1/2019 | Brabec | G06N 20/00 |
| 2019/0220710 | A1 * | 7/2019 | Song | G06F 18/2193 |
| 2019/0297105 | A1 * | 9/2019 | Brabec | G06N 20/00 |
| 2019/0377819 | A1 * | 12/2019 | Filliben | G06N 3/045 |
| 2021/0042664 | A1 * | 2/2021 | Wang | G06Q 50/12 |
| 2021/0049467 | A1 * | 2/2021 | Riedmiller | G06N 3/08 |
| 2021/0142152 | A1 * | 5/2021 | Burkhart | G06N 3/047 |
| 2021/0240933 | A1 * | 8/2021 | Song | G06F 40/30 |
| 2021/0287111 | A1 * | 9/2021 | Zhou | G06Q 30/016 |
| 2022/0004892 | A1 * | 1/2022 | Wang | G06F 40/30 |
| 2022/0005608 | A1 * | 1/2022 | Koo | G16H 50/20 |
| 2022/0101103 | A1 * | 3/2022 | Fatemi | G06N 3/045 |
| 2022/0108188 | A1 * | 4/2022 | Wu | G06N 5/02 |
| 2022/0207343 | A1 * | 6/2022 | Lei | G06N 3/09 |
| 2022/0222520 | A1 * | 7/2022 | Min | G06N 3/045 |
| 2022/0335300 | A1 * | 10/2022 | Ben-Itzhak | G06N 3/084 |
| 2022/0392198 | A1 * | 12/2022 | Kroenke | G06V 10/82 |
| 2022/0414792 | A1 * | 12/2022 | Huang | G06N 3/063 |
| 2023/0088676 | A1 * | 3/2023 | She | G06N 3/088 |
| | | | | 706/25 |
| 2023/0094293 | A1 * | 3/2023 | Hong | G06Q 30/02 |
| | | | | 706/21 |
| 2023/0101250 | A1 * | 3/2023 | Kosman | G06V 10/82 |
| | | | | 382/156 |
| 2023/0153568 | A1 * | 5/2023 | Guan | G06N 3/04 |
| | | | | 706/25 |
| 2023/0177355 | A1 * | 6/2023 | Narayanam | G06N 5/01 |
| | | | | 706/46 |
| 2023/0206058 | A1 * | 6/2023 | Wellmann | G06N 3/084 |
| | | | | 706/25 |
| 2023/0206076 | A1 * | 6/2023 | Xu | G06N 3/096 |
| | | | | 706/15 |
| 2023/0214674 | A1 * | 7/2023 | Seo | G06N 5/022 |
| | | | | 706/25 |
| 2023/0267322 | A1 * | 8/2023 | Hou | G06F 40/30 |
| | | | | 706/15 |
| 2023/0316076 | A1 * | 10/2023 | Morris | G06N 20/20 |
| | | | | 706/15 |
| 2024/0054326 | A1 * | 2/2024 | Dave | G06N 3/08 |
| 2024/0054356 | A1 * | 2/2024 | Liu | G06N 20/00 |
| 2024/0104348 | A1 * | 3/2024 | Zheng | G06N 3/045 |
| 2024/0127046 | A1 * | 4/2024 | Lapointe | G06N 5/022 |
| 2024/0176993 | A1 * | 5/2024 | Jain | G06N 3/0895 |
| 2024/0256824 | A1 * | 8/2024 | Singh | G06N 3/084 |
| 2024/0256914 | A1 * | 8/2024 | Ezrielev | G06N 5/022 |
| 2024/0330679 | A1 * | 10/2024 | Luo | G06Q 10/04 |
| 2024/0427821 | A1 * | 12/2024 | Zhao | G06F 18/22 |
| 2025/0028928 | A1 * | 1/2025 | Crisan | G06N 3/084 |
| 2025/0111189 | A1 * | 4/2025 | Schweizer | G06N 3/045 |
| 2025/0139165 | A1 * | 5/2025 | Breen | G06F 16/9024 |
| 2025/0148280 | A1 * | 5/2025 | Cocos | G06N 3/08 |
| 2025/0308203 | A1 * | 10/2025 | De | G06V 10/426 |

OTHER PUBLICATIONS

International Search Report and Written Opinion received for PCT Application No. PCT/US2024/019629, Jun. 24, 2024, 11 pages.

Zhang, et al., "Metapath and syntax-aware heterogeneous subgraph neural networks for spam review detection", Applied Soft Computing, vol. 128, Oct. 2022, pp. 1-13.

Chen, et al., "Fastgen: fast learning with graph convolutional networks via importance sampling", In Proceedings of International Conference on Learning Representations, Apr. 30, 2018, pp. 1-15.

Defferrard, et al., "Convolutional neural networks on graphs with fast localized spectral filtering", In Proceedings of the 30th International Conference on Neural Information Processing Systems, Dec. 5, 2016, 9 Pages.

Frasca, et al., "SIGN: Scalable Inception Graph Neural Networks", In repository of arxiv code: 2004.11198v3 [cs.LG], Nov. 3, 2020, 17 Pages.

Fu, et al., "MAGNN: Metapath Aggregated Graph Neural Network for Heterogeneous Graph Embedding", In Proceedings of The Web Conference, Apr. 20, 2020, 11 Pages.

Hamilton, et al., "Inductive representation learning on large graphs", In Journal of Advances in neural information processing systems, Dec. 4, 2017, pp. 1-11.

Hamilton, et al., "Representation learning on graphs: Methods and applications", In Journal of Computing Research Repository of https://arxiv.org/pdf/1709.05584.pdf, Sep. 17, 2017, 24 Pages.

Hu, et al., "Heterogeneous Graph Transformer", In Proceedings of The Web Conference, Apr. 20, 2020, pp. 2704-2710.

Hu, et al., "Open Graph Benchmark: Datasets for Machine Learning on Graphs", In Proceedings of Conference on Neural Information Processing Systems, May 2, 2020, 16 Pages.

LV, et al., "Are we really making much progress ?: Revisiting, benchmarking and refining heterogeneous graph neural hetworks", In Proceedings of the 27th ACM SIGKDD Conference on Knowledge Discovery & Data Mining, Aug. 14, 2021, pp. 1150-1160.

Qiao, et al., "Tree Structure-Aware Graph Representation Learning via Integrated Hierarchical Aggregation and Relational Metric Learning", In IEEE International Conference on Data Mining, Nov. 17, 2020, pp. 432-441.

Schlichtkrull, et al., "Modeling Relational Data with Graph Convolutional Networks", In Repository of arXiv:1703.06103v1, Mar. 17, 2017, 10 Pages.

Shi, et al., "Masked Label Prediction: Unified Message Passing Model for Semi-Supervised Classification", In Repository of arXiv:2009. 03509v4, Oct. 15, 2020, 9 Pages.

Sun, et al., "Scalable and Adaptive Graph Neural Networks with Self-Label-Enhanced Training", In repository of arxiv code: 2104. 09376v3 [cs.LG], Jul. 1, 2021, 23 Pages.

Tai, et al., "Improved Semantic Representations from Tree-structured Long Short-term Memory Networks-", In repository of arxiv code: 1503.00075v3 [cs.CL], May 30, 2015, 11 Pages.

Trouillon, et al., "Knowledge Graph Completion via Complex Tensor Factorization", In repository of arxiv code: 1702.06879v2 [cs.AI], Nov. 26, 20217, 38 Pages.

Velickovic, et al., "Graph Attention Networks", In Proceedings of 6th International Conference on Learning Representations, Apr. 30, 2018, 12 Pages.

Wang, et al., "Bag of Tricks for Node Classification with Graph Neural Networks", In repository of arxiv code: 2103.13355v4 [cs.LG], Oct. 15, 2021, 6 Pages.

Wang, et al., "Heterogeneous Graph Attention Network", In Proceeding of the World Wide Web Conference, May 13, 2019, pp. 2022-2032.

Wu,, et al., "Simplifying Graph Convolutional Networks", In Proceedings of the 36th International Conference on Machine Learning, Jun. 2019, 11 Pages.

(56) References Cited

OTHER PUBLICATIONS

Yang, et al., "Simple and Efficient Heterogeneous Graph Neural Network", In repository of arxiv code: 2207.02547v2 [cs.LG], Dec. 5, 2022, 10 Pages.

Yu, et al., "Scalable Graph Neural Networks for Heterogeneous Graphs", In repository of arxiv code: 2011.09679v1 [cs.LG], Nov. 19, 2020, 13 Pages.

Zhang, et al., "Graph Attention Multi-Layer Perceptron", In Proceedings of the 28th ACM SIGKDD Conference on Knowledge Discovery and Data Mining, Aug. 14, 2022, pp. 4560-4570.

Zhang, et al., "Heterogeneous Graph Neural Network", In Proceedings of the 25th ACM SIGKDD International Conference on Knowledge Discovery & Data Mining, Aug. 4, 2019, pp. 793-803.

Zhu, et al., "Learning from labeled and unlabeled data with label propagation", Retrieved from: https://mlg.eng.cam.ac.uk/zoubin/papers/CMU-CALD-02-107.pdf, Sep. 16, 2002, 19 Pages.

Zhu, et al., "Simple spectral graph convolution", In Proceeding of International Conference on Learning Representations, May 3, 2021, 15 Pages.

Zou, et al., "Layer-Dependent Importance Sampling for Training Deep and Large Graph Convolutional Networks", In Proceeding of Conference on Neural Information Processing Systems, Sep. 7, 2019, 11 Pages.

International Preliminary Report on Patentability (Chapter I) received for PCT Application No. PCT/US2024/019629, Oct. 9, 2025, 6 pages.

* cited by examiner

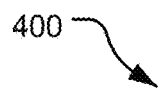
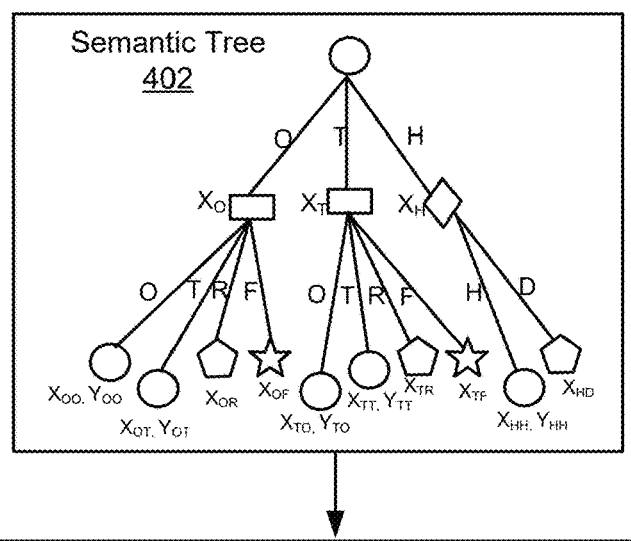
Semantic Tree Encoder
404
If $Y_P$ is defined for Metapath:    $M_P = NN_P(X_P \parallel Y_P)$
Else:                $M_P = NN_P(X_P)$
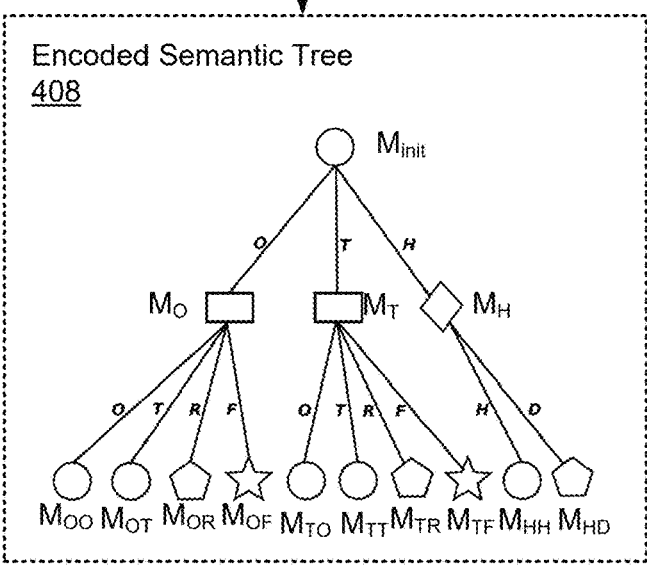
FIG. 4

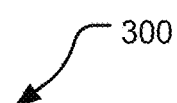

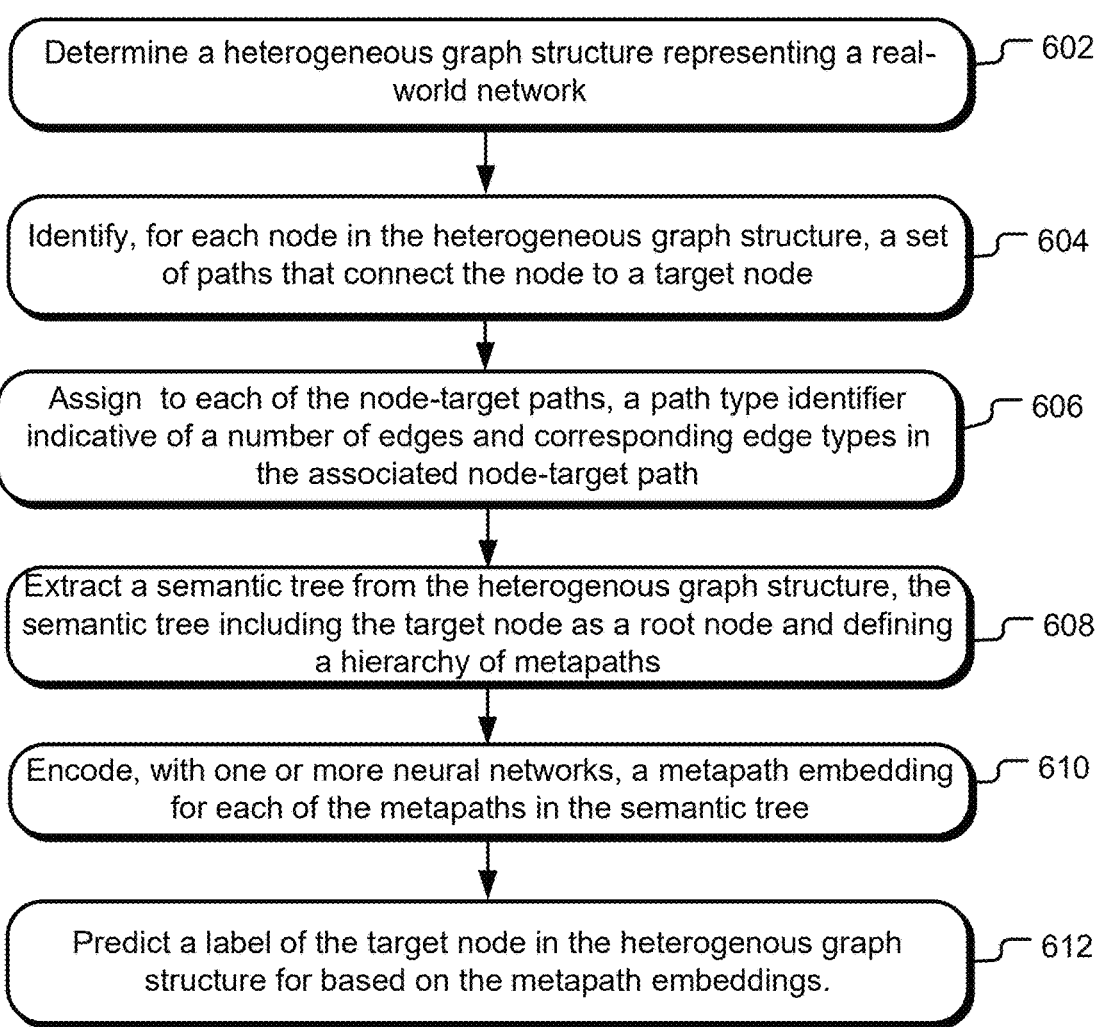

Determine a heterogeneous graph structure representing a real-world network    ⌐ 602

Identify, for each node in the heterogeneous graph structure, a set of paths that connect the node to a target node    ⌐ 604

Assign to each of the node-target paths, a path type identifier indicative of a number of edges and corresponding edge types in the associated node-target path    ⌐ 606

Extract a semantic tree from the heterogenous graph structure, the semantic tree including the target node as a root node and defining a hierarchy of metapaths    ⌐ 608

Encode, with one or more neural networks, a metapath embedding for each of the metapaths in the semantic tree    ⌐ 610

Predict a label of the target node in the heterogenous graph structure for based on the metapath embeddings.    ⌐ 612

FIG. 6

HETEROGENEOUS TREE GRAPH NEURAL NETWORK FOR LABEL PREDICTION

BACKGROUND

Graph embedding, also known as network embedding and network representation learning, is a useful technique that helps researchers analyze information networks through embedding a network into a vector space. In general, embedding refers to the translation of numerical datasets (e.g., features in vector form) into a vector space where mathematical distances between pairs of vectors correlate with a learned degree of similarity between the data stored by each of the vectors.

A graph neural network (GNN) encodes graph data into embeddings using learned weights, and the resulting embeddings are usable to make various predictions with regard to the entities and relationships represented within the graph data, such as to predict a label (e.g., a classification) for a node of interest. During the embedding process, localized information of the graph is translated into embeddings that each represent a corresponding neighborhood of the graph. For example, the GNN may generate a node embedding based on features of a corresponding node in the graph, features of nearby nodes, and attributes of nearby edges. Using various techniques, data can then be propagated through the structure of the graph to make predictions pertaining to target nodes or edges.

SUMMARY

According to one implementation, a method for making predictions based on heterogeneous graph data includes determining a heterogeneous graph structure representing a real-world network and identifying, for each node in the heterogeneous graph structure, a set of node-target paths that connect the node to a target node. The method further includes: assigning, to each of the node-target paths identified for each node, a path type identifier indicative of a number of edges and corresponding edge types in the associated node-target path. A semantic tree extracted from the heterogeneous graph structure includes the target node as a root node and defines a hierarchy of "metapaths," where each metapath is a single path in the semantic tree that corresponds to a subset of the node-target paths in the heterogeneous graph structure assigned to a same path type identifier. The method further includes encoding, with one or more neural networks, a set of metapath embeddings. Each of the metapath embeddings represents a different metapath in the semantic tree and encodes aggregated feature-label data for nodes in the heterogeneous graph structure that correspond to the path type identifier associated with the metapath. A label prediction is then generated for the target node in the heterogeneous graph structure based on the metapath embeddings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 4 illustrates example encoding operations performed by a prediction system implementing the disclosed technology.

FIG. 6 illustrates example operations for using a heterogeneous graph neural network to make predictions about heterogeneous graph data.

DETAILED DESCRIPTION

Figure 1:
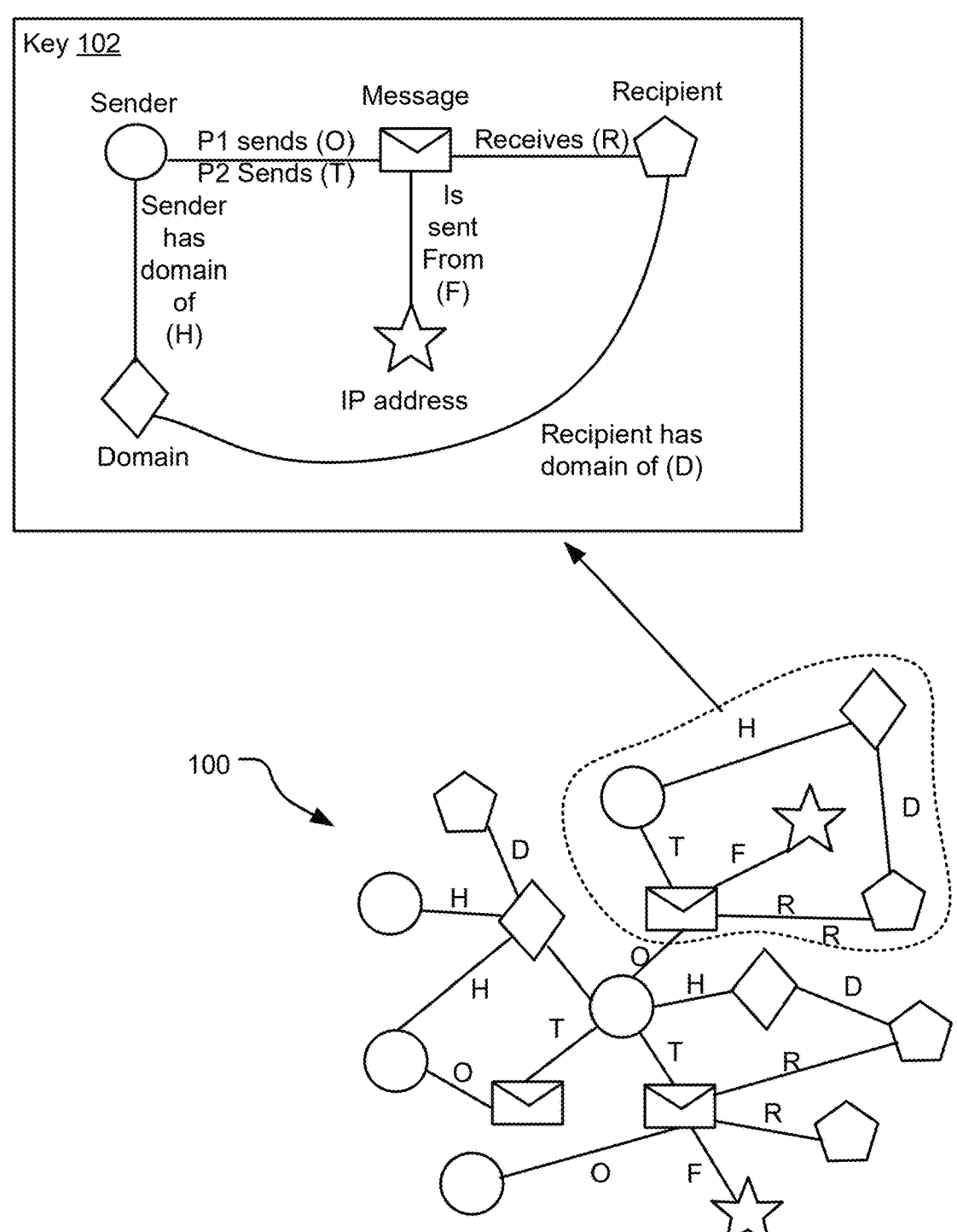
FIG. 1 illustrates an example of an unstructured heterogeneous graph representing a communications network.

Graph neural networks (GNNs) are a useful tool in modeling communications between users. A homogenous GNN is a common type of GNN that models a single type of relationship between nodes. For instance, a homogenous GNN that models a communications network is likely to represent user accounts as nodes with edges between the nodes representing communications exchanged between the accounts. Homogenous GNNs tend to oversimplify the complexity of real-world communication networks by ignoring other types of relationships that may be of interest when making predictions.

Consider, for example, the task of predicting whether a user email account has been compromised (e.g., hacked). In the real world, a hacker may utilize a single internet protocol (IP) address to send malicious messages from multiple different email accounts. The IP address associated with a given message is therefore a key piece of information that enables a quick determination of whether or not two messages from different email addresses are actually from the same person. Yet, the relationship between an IP address and a user account is not easily represented in a homogenous graph structure where nodes represent users or accounts and edges represent communications. Likewise, a hacked account may be characterized by a disproportionate number of outgoing emails as compared to incoming emails. In a typical homogenous graph, the direction of a communication represented by a given edge cannot be easily extracted. Although this type of information may be encapsulated by an embedding representing a particular communication (e.g., edge) or user account (e.g., node), the extraction of such information entails some vector analysis. Moreover, the encapsulation of different types of relationships within a single node embedding or edge embedding dilutes the predictive capability of the GNN since certain types of relationships inherently become "mixed" in the data with other types of relationships. This undesirable phenomena is commonly referred to as semantic mixing.

In contrast to homogenous GNNs, heterogeneous GNNs include different types of nodes and are in many cases better suited to modeling of real world problems. A heterogeneous GNN accepts as an input a heterogeneous graph that has two or more types of nodes (e.g., a first node type representing a first type of entity, such as a user, and a second node type representing a second type of entity, such as an IP address). Inherently, heterogeneous graphs captures different types of relationships since a relationship between some nodes (e.g., user-to-user) are different in nature than relationships between other nodes (e.g., user-to-IP address). However, one shortcoming of existing heterogeneous GNNs is the semantic mixing that occurs during the process of scaling large networks down to workable sizes that can be meaningfully analyzed given modern constraints on compute power and time. For example, a common heterogeneous GNN treats metapaths of different hops (levels) equally and ignores the parent-children hierarchy among metapaths. Consequently, structural information and semantic structure are lost, diminishing the GNN's predictive capability. In addition, the above-described level-by-level aggregation is also computationally expensive to implement.

The disclosed technology provides a prediction system that that scales a heterogeneous GNN in a manner that also preserves graph structure and semantic separation (e.g., separation between embeddings corresponding to different types of nodes and different types of edges).

In one implementation, the prediction system extracts a semantic tree from a heterogeneous graph structure. The semantic tree defines a hierarchy of metapaths where each metapath corresponds to a subset of paths in the heterogeneous graph structure that connect to a target node of interest and that are defined by a same number of edges and a same sequence of edge types. The semantic tree is encoded using a neural network trained for each metapath (e.g., with different learned weights for each metapath) to translate feature and label information for nodes associated with the metapath into a same latent space where a distance between vectors is representative of vector-to-vector similarity. Regardless of the size of the input vector(s) associated with each metapath, all embeddings generated are of a common size.

The disclosed technology further includes a novel methodology for using the resulting encoded semantic tree to predict a node label with a level of accuracy that is higher than other common approaches. A sequential neural network such as a recurrent neural network (RNN), gated recurrent unit (GRU), one-dimensional convolutional neural network (1D-CNN), or long short-term memory (LSTM), is used to propagate information up the semantic tree, from the leaves to the root node, reducing the semantic tree to a single embedding that represents the tree as a whole and that is usable to predict a label of the root node. In one implementation, the sequential neural network utilizes a novel input-hidden attention mechanism during this aggregation that aggregates hidden embeddings from child nodes into each parent node, essentially allowing the embedding generated for each parent node to be influenced by the embeddings of its children, with the degree of each child's influence being weighted in proportion to a learned importance between the child and the parent. The use of this novel input-hidden attention mechanism leads to greater accuracy in the node label predictions generated by the prediction system.

The disclosed modeling techniques provide a predictive capability that outperforms the state-of-art architectures in terms of scalability as well as accuracy.

In the examples provided herein, the disclosed modeling techniques are used to model a communications network and to predict a label for a given node of the network. In one implementation, the predicted label is a classification that identifies whether or a not a particular email account has been compromised. In another implementation, the predicted label is a classification for message that indicates whether or not the message is a spam message. In yet still another implementation, the predicted label indicates whether or not an IP address is associated with a malicious actor. Notably, these instances represent just a handful of the many types of predictions facilitated by the disclosed technology. In the examples disclosed herein, the predictions rendered are binary (2-class)—e.g., a sender node is classified as either a compromised account or a non-compromised account. In other implementations, the disclosed prediction technology renders a multi-class prediction system. For example, the prediction may predict an outcome of 3+ possibilities (e.g., a sender node can be classified as good, sender of phishing spam, sender of malware, or other bad behavior).

Understandably, the same techniques could be applied on different training data to make predictions about other types of networks modeled in the same way (e.g., other than communication networks).

FIG. 1 illustrates an example of an unstructured heterogeneous graph (e.g., graph 100) representing a communications network. The graph includes different types of nodes represented by different shapes and different types of edges denoted by letters (e.g., O, T. F. R. D) that represent different types of relationships between nodes. The graph 100 is said to be 'unstructured' because it can assume a variety of different formats.

In the illustrated example, there are five types of nodes and five edge types. However, other implementations may define other types of nodes and/or edge types representing relationships of interest between the nodes. As shown by graph key 102, a circular node represents a message "sender" while a pentagon-shape node represents a message "recipient". Messages are themselves represented as rectangular nodes, while domains are denoted by diamond-shaped nodes, and star-shaped nodes are used to represent individual IP addresses.

Notably, different types of nodes can be characterized by different types of node-to-node relationships. For instance, an H-type edge connects a sender node (circle) to a domain (diamond) and indicates that the sender has an email address hosted by the domain represented by the domain node. Likewise, a D-type edge connects a recipient node to a domain node, indicating that the recipient has an email address hosted by the domain represented by the domain node. Sender nodes (circles) are connected to message nodes (rectangles) by one of two edge types—O or P, where O indicates that the sender is a P1 sender while P indicates that the sender is a P2 sender, where P1 conveys that the message has been sent by its true sender while P2 conveys that the message is being sent by a third party on behalf of the true sender (e.g., consistent with the common understanding of P1 and P2 in the tech space). The graph 100 additionally includes R-type edges that each connect a message to the recipient of that message. Finally, F-type edges each connect a message to an IP address, which indicates that the message is sent from that IP address.

The graph 100 represents just one example of a heterogeneous unstructured graph sufficient that can serve as an input to a prediction system implementing the disclosed technology.

Figure 2:
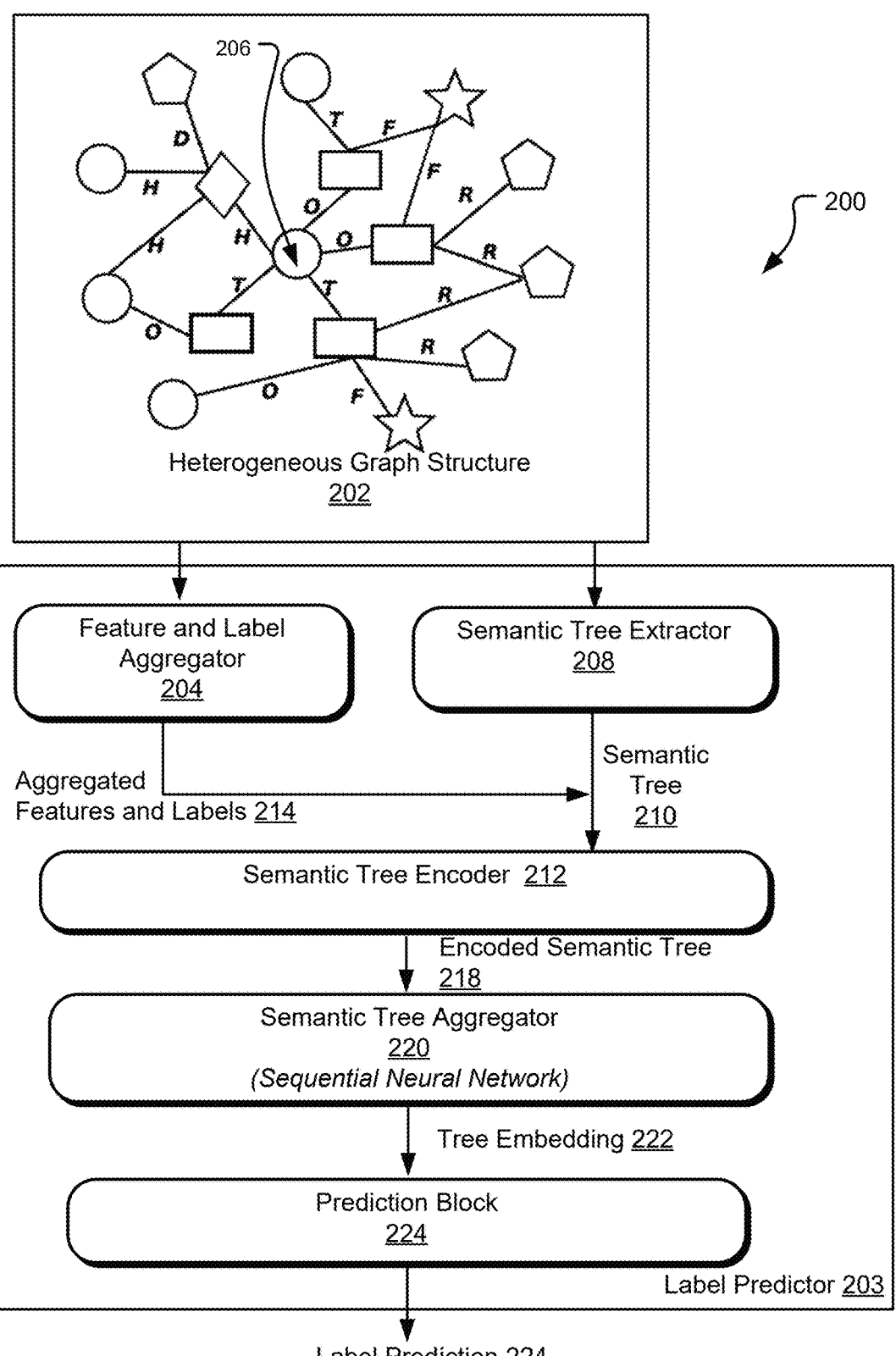
FIG. 2 illustrates an example prediction system that uses a heterogeneous graph neural network (GNN) to encode a heterogeneous graph structure.

FIG. 2 illustrates an example prediction system 200 that uses a heterogeneous graph neural network (GNN) to encode a heterogeneous graph structure 202. Notably, examples of the individual components of the prediction system 200 and their respective functions are further discussed with respect to each of FIGS. 2-5. Some systems implementing the disclosed technology may implement fewer than all components shown in FIG. 2 or some components used in addition to or in place of those shown.

The prediction system 200 includes a label predictor 203 that accepts as input a heterogeneous graph structure 202 and outputs a label prediction 224 for a target node 206 in the heterogeneous graph structure 202. As used herein, "label" refers generally to a classification of a graphical component, such as a node. The label for the graphical component (e.g., node) is separate from feature data of the graphical component. Machine learning tasks are commonly trained on features and labels to teach a model to learn to predict one or more labels given a set of features.

In FIG. 2, the heterogeneous graph structure 202 models a communication graph and includes the same node and edge types as those described in detail with respect to FIG. 1. The heterogeneous graph structure 202 includes at least two different types of nodes but may, in various implementations, include variable numbers of node types and represent a variety of types of networks.

In one implementation, each node in the heterogeneous graph structure 202 is defined by a set of features represented as a vector (a "feature vector"). For example, a feature vector representing a message sender or message recipient may include information associated with the sender or recipient such as an account id (e.g., email address), signature block characteristics, profile information (e.g., a place of employment, title/rank within an organization), messaging statistics (e.g., a frequency of inbound v. outbound emails), features characterizing the type(s) of message that the user frequently sends or receives (e.g., self-composed v. forwarded), the typical language used (e.g., English), style/format of messages sent (e.g., average number of words, frequency of sent emails that include attachments, preferred fonts/sizes), and other information. Likewise, a feature vector for a domain node may include a domain identifier and statistics about the domain, while a feature vector for a message node may include the actual content of the message and message header. Similarly, a feature vector for an IP address node identifies the IP address and well as other information, such as the geographical region associated with the IP address, language spoken in the region, and any other information potentially relevant for making a prediction of interest pertaining to information captured in the heterogeneous graph structure.

In addition to the set of features, some or all nodes may be further characterized by one or more labels represented as a vector (e.g., a "label vector"). Labels represent a ground truth of the node (e.g., where the ground truth is a classification of the node being predicted). In common practice, labels are typically binary. Labels may not be known for all nodes and in some cases may not exist for all nodes; however, at least some labels are included in the initial training datasets used to train the GNN and sequential neural network components of the label predictor 203. The label predictor 203 is trained, during a training process on a large dataset with known labels, to predict the label for a target node in the heterogeneous graph structure 202.

Traditionally, labels are provided in a training dataset to a machine learning model to facilitate computation of a loss function that quantifies how well the model is predicting the known labels in the training dataset. This computation is used to optimize the "weights" of the model that are usable to transform a dataset input to the model to the model's output (e.g., the predicted label or set of labels). However, unlike data in traditional machine learning tasks such as object detection in images, node labels in a graph can be highly dependent upon one another. For this reason, one implementation of the label predictor 203 utilizes labels from the training set in the forward phase of message propagation (e.g., essentially wrapping up the labels and features) in the data that is propagated through the graph structure during training so that the learned model weights are based on the intrinsic correlations between features and labels of the entire graph as opposed to merely the feature/label correlation for the target node assessed by the loss function.

In the above implementation where labels are propagated through the graph structure during training of the label predictor 203, the training and optional validation datasets include label data for a subset of nodes in the heterogeneous graph structure 202. Labels may not be known for all nodes of a given type of node and may not exist for all node types.

During training of the label predictor 203, label and feature data is known for all nodes of a given type (e.g., the sender nodes). During each training round, a node is selected as the target node and the feature and label data for other neighboring nodes is used to predict the label vector for the target. This predicted label vector for the target is then compared to the actual label vector for the target node (which is known during training) and used to compute loss and adjust model weights.

In one implementation where the label predictor 203 predicts a label vector for a target sender node, the non-target sender nodes are each characterized by a feature vector (as described above) and a label vector indicating whether the non-target sender node is "malicious" or "not malicious," where a malicious classification indicates a compromised account in the sense that the associated account is either owned by or frequently used by a nefarious actor to perform certain predefined actions, such as sending spam messages, phishing emails, or distributing malware. Notably, this label data may not exist for all node types (e.g., recipient nodes, domain nodes, IP address nodes). For this reason, the disclosed architecture allows label information to be optionally provided in the heterogeneous graph structure 202 (to enrich the known dataset) when available.

In the above-described implementation where some of the sender nodes include label data indicating "malicious" or "not malicious", the label predictor 203 is trained to predict the label of a select target node in the heterogeneous graph structure 202. During training, the actual label of the target node is known and compared to the predicted label to compute a loss function that is, in turn, used to adjust model weights. In post-training use of the label predictor 203, the labels being predicted are of course not known. In one implementation, label predictor 203 predicts an unknown label for a target node based on an input dataset that includes feature vectors for all nodes that serve as neighbors to the target and that further includes label vectors for a subset of those neighboring nodes that are of a same node type as the target node.

In another implementation, some or all of the message nodes in the heterogeneous graph structure include labels denoting associated message content as "spam" or "not spam," and the label predictor 203 predicts whether a given message lacking such a label is or is not spam. Notably, this label data may not be known for all of the message nodes, and labels are in this case not provided for other node types.

In addition to feature vectors, label vectors, and nodes, and edges, the heterogeneous graph structure 202 also designates a target node 206, representing the entity that the label is to be predicted for.

Upon receipt of the heterogeneous graph structure 202, a feature label and aggregator 204 performs feature and label aggregation to generate aggregated features and labels 214. In traditional heterogeneous GNNs, feature aggregation is performed at each layer of the GNN; however, this results in semantic mixing whereby features aggregated together may correspond to different node and/or edge types. In the proposed approach, feature and label aggregation is done once and as a pre-processing step, prior to using a neural network to encode the heterogeneous graph structure. A novel aggregation technique is employed to ensure that there is no semantic mixing of different node types or edge types during the aggregation of feature and label data and/or during the creation of embeddings based on the feature and label data.

According to one implementation, aggregating the feature and label data entails identifying, for each node in the heterogeneous graph structure 202, a complete set of node-target paths that connect the node to the target node. Each different node-target path is assigned a path type identifier that is indicative of a number of edges and corresponding edge types in the associated node-target path. Feature and label aggregation is performed based on the path type identifier. For instance, aggregation is performed with respect to groups of the features and labels that, within each aggregated group, are associated with nodes characterized by a same path type identifier. Further examples of this aggregation are discussed with respect to FIG. 3.

A semantic tree extractor 208 extracts a semantic tree 210 from the heterogeneous graph structure 202. This semantic tree can be understood as initially including a tree like structure representing a target node of interest as the root node. The semantic tree includes a set of branches connecting internal nodes and leaf nodes to the root node. Each one of these paths is referred to as a "metapath" and is characterized by one of the path type identifiers that is different from all other metapaths in the same semantic tree. Each metapath corresponds to and represents the subset of all node-target paths in the heterogeneous graph structure 202 that are assigned to the path type identifier associated with the metapath. Examples of metapaths are discussed in greater detail with respect to FIGS. 2 and 3.

The aggregated features and labels 214 are passed, along with the semantic tree 210, to a semantic tree encoder 212. The semantic tree encoder 212 utilizes one or more trained neural networks to create embeddings corresponding to the aggregated features and labels 214, effectively translating the aggregated features and label information for each different one of the metapaths (e.g., each different path ID) into a metapath embedding representing that metapath.

In one implementation, the semantic tree encoder 212 includes a collection of separately-trained neural networks (NNs) that are used, in the alternate, to embed input data based on characteristics of the input data. In one implementation, all embeddings created by the semantic tree encoder 212 are of a same size despite differences in size between feature vectors of different node types and despite the fact that the input data may include labels for some nodes and not for other nodes.

In one implementation, the semantic tree encoder 212 includes a different neural network trained in association with each different metapath in the semantic tree 210. For example, a first set of learned weights is used to embed the aggregated feature and label information associated with a first metapath (e.g., characterized by a first path type identifier), while a second different set of learned weights is used to embed the aggregated feature and label information associated with a second different metapath (e.g., characterized by a second path type identifier), and so on with a different neural network being used to embed the aggregated feature and label data associated with each metapath.

The semantic tree encoder 212 essentially transforms the aggregated feature and label information for each metapath into a set of embeddings of equal size defined within the same latent space. The nodes of the semantic tree 210 are then populated with these embeddings (e.g., each embedding populating a different leaf node), and the resulting structure is referred to herein as an encoded semantic tree 218.

The encoded semantic tree 218 is then passed to a semantic tree aggregator 220, which uses a trained sequence neural network, such as a GRU, LSTM, RNN, or Sequence Transformer model with Attention, or 1-D CNN to aggregate the embeddings of the encoded semantic tree 218 in a bottom-up fashion, effectively propagating information from each child to its parent, condensing the encoded semantic tree 218 into a single embedding representing the tree as a whole (referred to elsewhere herein as a "tree embedding 222"). This tree represents a prediction of the features for the root node based on the information propagated up the encoded semantic tree 218 and, in some implementations, based on other information (e.g., known features of the root node) as well. The tree embedding 222 is output to a prediction block 224 (e.g., an output layer) that predicts the label (or class of labels) for the target node 206 in the heterogeneous graph structure 202.

Figure 3:
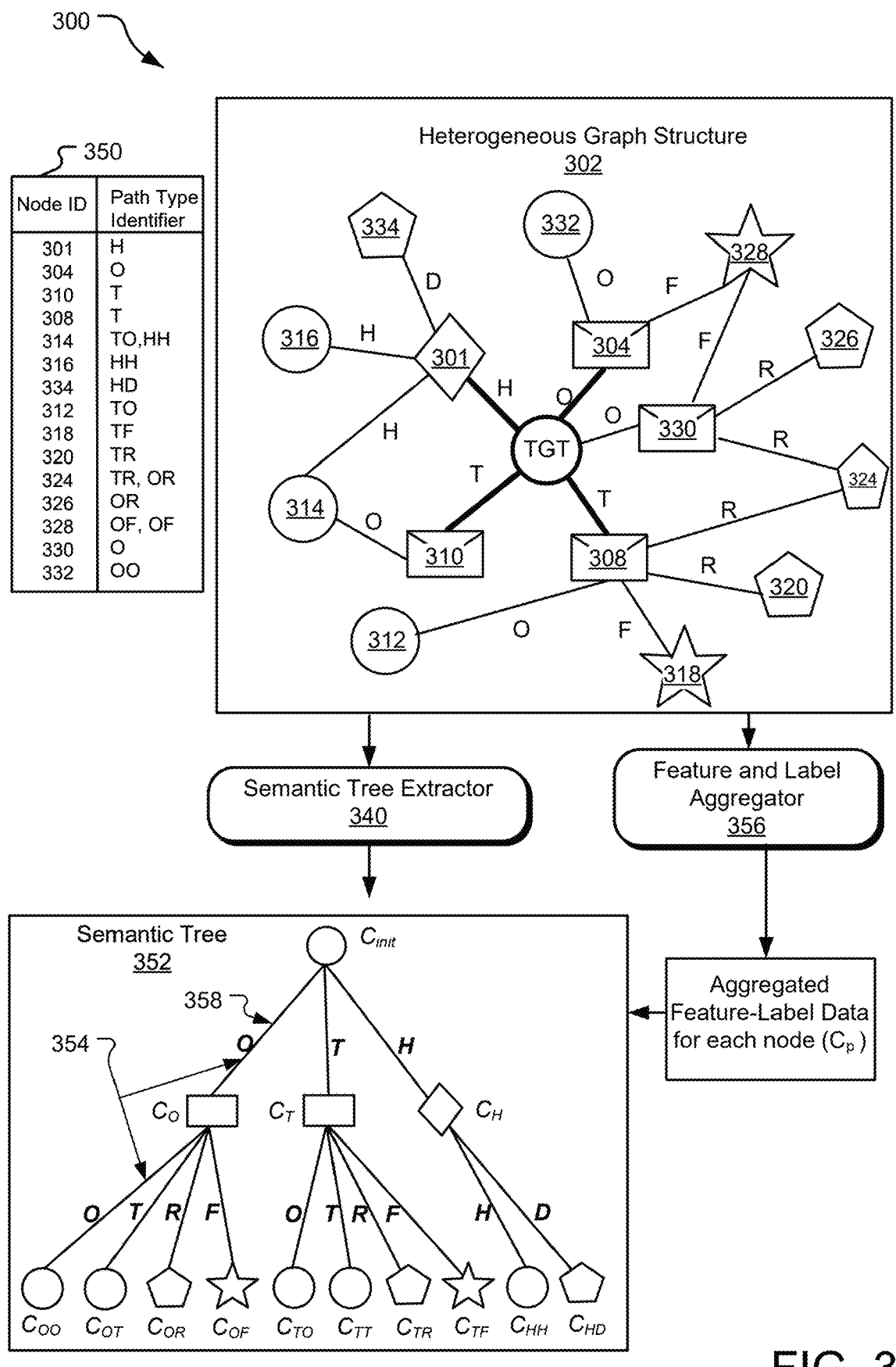
FIG. 3 illustrates example pre-processing operations performed by a prediction system implementing the disclosed technology.

FIG. 3 illustrates example pre-processing operations performed by a prediction system 300 that that uses one or more trained neural networks to make predictions pertaining to a heterogeneous graph structure 302. In FIG. 3, the heterogeneous graph structure 302 is, for conceptual clarity, identical to the communications network graphically represented with respect to FIG. 1 and FIG. 2 except that it additionally numerical identifiers labeling each node to help illustrate concepts pertaining to feature and label aggregation as well as extraction of a semantic tree. In various implementations, the heterogeneous graph structure is any graph structure with two or more types of nodes that models or represents a real-world network.

A semantic tree extractor 340 analyzes the heterogeneous graph structure and identifies a set of "metapaths" collectively representing the complete set of connections between the target node of interest (TGT) and each other node in the heterogeneous graph structure 302. Each metapath corresponds to a unique path type identifier and can be understood as representing a set of node-target paths in the heterogeneous graph structure 302 that are characterized by a same path type identifier. As used herein, the term "node-target path" refers to a path that connects a node to a target node of interest (TGT), e.g., the node that the prediction is to be made for.

To identify the different metapaths, the semantic tree extractor 340 initially identifies, for each individual node, a complete set of node-target paths that connect the node to the target node. The semantic tree extractor 340 then assigns a path type identifier to each different one of the identified node-target paths for each node. The path type identifier is indicative of a number of edges and corresponding edge types in the associated node-target path.

By example, a table 350 illustrates path type identifiers assigned to each node in the heterogeneous graph structure 302. In the example shown, the maximum node-target path length is two edges, leading to a semantic tree depth of 2 (discussed below). However, in other implementations, the maximum node-target path length is some other number of edges (e.g., 1, 3, 4, 5, etc.) leading to semantic trees of different depth than the example shown. Nodes that connect to the target node via a single path are assigned a single path type identifier. In contrast, nodes that connect to the target node via multiple paths are assigned multiple different path type identifiers (e.g., one for each different path).

In the table 350, each of the path type identifiers denotes the type of edges in the corresponding node-target path sequenced with increasing distance from the target node. For example, node 301 is a domain node (representing a domain, per the notation described with respect to FIG. 1) and is connected to the target node by a single-edge path of path type H, where H is used to denote that the target node (a sender) has an account hosted by the domain of node 301. Since the entire path between node 301 and the target (TGT) includes a single edge, the edge type identifier "H" is also the only path type identifier assigned to node 301.

With continued reference to the heterogeneous graph structure 302, the node 310 is a message node that is connected to the target node (TGT) by a single T-edge, where T is used to denote that the target acted as a P2 sender of the message (see FIG. 1 graph key 102). Here, "T" is the path type identifier for node 310.

In contrast to the above examples, node 314 represents a message sender and is connected to the target node (TGT) though two separate paths that each contain two edges. Tracing these paths outward from the target node (TGT) to node 314, the first path includes edge types "HH" and the second type includes edge types "TO." In this case, the node 314 is assigned two path type identifiers—HH and TO, representing the two different paths between the node 314 and the target.

The semantic tree extractor 340 utilizes the information illustrated within the table 350 to build a semantic tree 352 of metapaths. The semantic tree 352 has a root node ($C_{init}$) that corresponds to the target node (TGT) in the heterogeneous graph structure 302. The root node $C_{init}$ is coupled to a number of leaf nodes (labeled $C_P$) that each correspond to a different metapath "P".

As discussed elsewhere herein, a metapath refers to a set of node-target paths (e.g., from different nodes to the same target) that are assigned to the same path type identifier. For example, a first metapath 358 in the semantic tree 352 has path type identifier O extending between nodes labeled $C_{init}$ and $C_O$. The metapath 358 generally represents the set of all node-target paths in the heterogeneous graph structure assigned to the path type identifier O (e.g., the path between the target node and node 304 and the path between the target node and node 330). By example, a second metapath 354 includes two edges and has path type identifier OO. This metapath represents the set of all paths in the heterogeneous graph structure 302 that are assigned to path type identifier OO (e.g., the single path extending from the target node to node 332).

In FIG. 3, the semantic tree 352 is shown including a node at each junction between edges. These nodes are labeled using the convention $C_P$, where P refers to the path type identifier for the metapath (e.g., O, OO. T, TO, etc.). At this stage of the disclosed methodology, the nodes $C_P$ are best understood as empty placeholder nodes that are to be populated. Population of the nodes $C_P$ is performed by a feature and label aggregator 356. Specifically, the feature and label aggregated 356 aggregates, for each metapath, the features for the nodes assigned to the metapath to create an aggregated feature vector $X_P$ and also the labels for the nodes assigned to the metapath to create an aggregated label vector $Y_P$ (if labels exist for the given node type).

As used herein, the term "aggregated feature-label data" is used to refer to either (1) an aggregated feature vector for a metapath; (2) a pair of vectors for a metapath consisting of an aggregated feature vector for the metapath and an aggregated label vector for the metapath. For metapaths without labels, the aggregated feature-label data consists of the former (e.g., an aggregated feature vector). For metapaths with labels, the aggregated feature-label data consists of the latter (e.g., an aggregated feature vector and an aggregated label vector).

To populate the empty node $C_O$ (shown in semantic tree 352 as corresponding to metapath 358 with path type identifier "O"), the feature and label aggregator 356 first creates an aggregated feature vector $X_O$ by aggregating the features of the nodes assigned to the path type identifier "O" (e.g., by aggregating the features of nodes 304 and 330). If the nodes assigned to the path type identifier (e.g., "O") have labels as well, the feature and label aggregator 356 also creates a label vector $Y_O$ by aggregating the labels of the nodes assigned to the path type identifier "O."

In one implementation where the prediction system 300 is used to predict whether or not a sender is malicious, sender nodes (e.g., circles in the heterogeneous graph structure 302) have labels while other nodes do not. In this implementation, the placeholder node $C_O$ in the semantic tree 352 is populated with the aggregated feature-label vector $[X_O]$, which lacks an aggregated label component. In contrast, the metapath 354 corresponds to the path type identifier "OO" and represents a path between the target (TGT) and a group of sender nodes 314, 312. By the same operations discussed above, the placeholder node Coo is populated with aggregated feature-label data of form $[X_{OO}, Y_{OO}]$, which includes both an aggregated feature component and an aggregated label component.

During a next step in the illustrated flow, the semantic tree 352 is encoded by a GNN vis a semantic tree encoder, such as that shown and described with respect to FIG. 4.

FIG. 4 illustrates example encoding operations performed by a system 400 that that uses one or more trained neural networks to make predictions pertaining to a heterogeneous graph structure, such as the heterogeneous graph structure shown in any of FIG. 1-3. The system 400 is, in one implementation, integrated into a larger system that includes components described with respect to other figures herein.

The system 400 includes a semantic tree encoder 404 that performs encoding operations on a semantic tree 402 received as input. The semantic tree 402 includes a plurality of metapaths that form a tree-like structure, with characteristics the same or similar to those generally described with respect to FIG. 3. Within the semantic tree 402, each node other than the root node corresponds to a different metapath that is defined by a path type identifier. The path type identifier identifies a number of edges and a sequence of edge types that separate the node from the root node. Each metapath represents a collection of node-target paths in the original heterogeneous graph structure (not shown) that are characterized by the same path type identifier.

At the time the semantic tree 402 is input to the semantic tree encoder 404, the nodes of the semantic tree 402 have already been populated with aggregated feature-label data, as generally described with respect to FIG. 3. Nodes corresponding to metapaths that have associated label information are each populated with a set of vectors $[X_P, Y_P]$ where $X_P$ is the aggregated feature vector for the metapath and $Y_P$ is the aggregated label vector for the metapath. Nodes corresponding to metapaths that do not have associated label information (e.g., labels do not exist or unknown) are populated with the aggregated feature vector $X_P$. Notably, the aggregated feature vector $X_P$ may be non-uniformly sized with respect to the different metapaths, depending on the types of features defined for each different type of node.

Although different implementations may have different characteristics, the semantic tree encoder 404 includes multiple different neural networks, each different one of the neural networks being trained to encode the aggregated feature-label data for a different one of the metapaths in the semantic tree 402 into a corresponding metapath embedding $M_P$. Stated differently, each metapath embedding $M_P$, with P being a path type identifier, is generated by providing the aggregated feature-label data for the metapath as input to a neural network (NN) trained on a training dataset consisting of aggregated feature-label data for metapaths of the same path type identifier "P".

In general, the encoding step performed by the semantic tree encoder 404 serves to translate the representations of each of the metapaths (e.g., the aggregated feature-label data) into vectors of a same size that are defined within a same latent space where a physical separation between each pair vectors correlates with a learned degree of similarity between them. The metapath embedding $M_P$ is a vector with size H, where H is a user-defined hidden dimension size. Notably, the aggregated feature-label data may vary in dimension for the various metapaths due to differences between node types (e.g., having different numbers and types of features of interest) and due to the fact that some metapaths have label information and some do not.

As shown in FIG. 4, the input to the neural network $NN_P$ is a vector and the NNs are different sizes depending on the value of P. If label information does not exist for the metapath "P", the vector input to the neural network is simply the aggregated feature vector $X_P$ (e.g., $M_P = NN_P$ $(X_P)$). If label information does exist for the metapath "P", the vector input to the neural network is a concatenation of the aggregated feature vector $X_P$ and the aggregated label vector $Y_P$ (e.g., $M_P = NN_P$ $(X_P \| Y_P)$). In another implementation, the expression $M_P = NN_P$ $(X_P \| Y_P)$ is used to represent the metapath embedding for all nodes, with $Y_P$ being replaced with a vector of zeros for the metapaths that do not have label vectors.

Information output by the semantic tree encoder 404 can be arranged in the form of an encoded semantic tree 408 that includes a metapath embedding corresponding to each node on the semantic tree 402.

Figure 5:
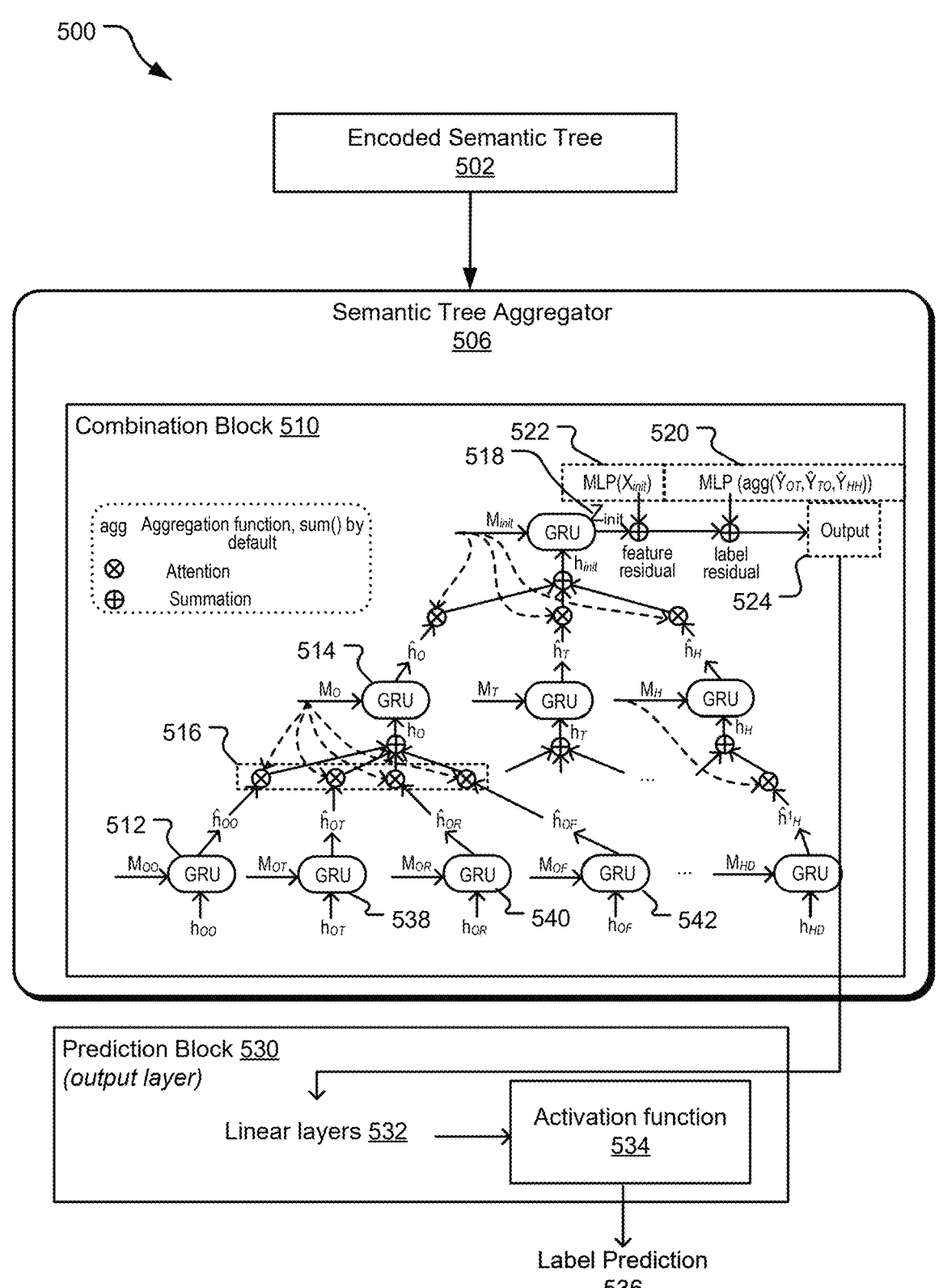
FIG. 5 illustrates example tree aggregation operations performed by a prediction system implementing the disclosed technology.

FIG. 5 illustrates example tree aggregation operations performed by a neural network within a system 500 that makes predictions about heterogeneous graph data. The system 500 is shown to include a semantic tree aggregator 506. As input, the semantic tree aggregator 506 receives an encoded semantic tree 502 that includes a hierarchy of metapaths and, for each metapath, a metapath embedding $M_P$. The encoded semantic tree 502 is, in one implementation, formed using the methodology generally discussed with respect to FIG. 3-4 (e.g., corresponding to the encoded semantic tree 408 output by the semantic tree encoder 404 of FIG. 4).

In one implementation, the system 500 operates within a larger system such as that shown in FIG. 2 (e.g., in which case, the semantic tree aggregator 506 of FIG. 5 performs the operations described with respect to the semantic tree aggregator 220 in FIG. 2).

The semantic tree aggregator 506 uses a sequential neural network to aggregate the embeddings of the encoded semantic tree 218 in a bottom-up fashion, effectively passing messages from each embedding up the tree to create a single tree embedding that represents the tree as a whole and that also represents a prediction of the root node's embedding. In FIG. 5, the sequential neural network employed is a gated recurrent unit GRU. However, it should be appreciated that other types of sequential neural networks may be suitably employed for the same purpose including, for example, LSTM, RNN, Simple RNN, a 1-D sequential CNN, Transformer Model with Attention, etc.

In traditional GNNs, messaging passing through a graph is performed by aggregating embeddings and updating the aggregated embeddings at each layer based on the adjacent layer(s) of the encoded network. In a scenario where the aggregation is done at the pre-processing phase, as described with respect to FIG. 2, this traditional aggregate/update process can be replaced by a one-time feature-label aggregation at the preprocessing phase (as described with respect to FIG. 3) followed by an encoding of the semantic tree 502 by a sequential neural network, as described below In the illustrated implementation, a GRU is used as the sequential neural network. Although other combinatorial techniques may be used, combination block 510 illustrates one suitable methodology for using the GRU to aggregate information stored within the encoded semantic tree 502 to make a prediction. The combination block 510 utilizes a novel input-hidden attention mechanism designed to emphasize hierarchical correlation between metapaths. At each node of the encoded semantic tree 502, the GRU receives as input a metapath embedding associated with the node and hidden state computed based on the associated child nodes. The GRU utilizes learned logic to discover and output another hidden state that can be understood as including some combination of the input hidden state information and the metapath embedding information for the node being encoded.

Looking to the bottom left of the tree shown in the combination block 510, a bottom left node 512 receives as input a hidden state $h_{OO}$ which is, at this lowest level of the tree, a vector of zeros. The GRU also receives as input the metapath embedding for the associated tree node, $M_{OO}$. In this case, the hidden state output is $\hat{h}_{OO}$ represents an encoding combination of $M_{OO}$ and $h_{OO}$. The hidden state output $\hat{h}_{OO}$ serves as the input hidden state to the GRU at the next layer up the tree.

The hidden state output $\hat{h}_{OO}$ output from the GRU operating on node 512 is input to a novel input-hidden attention mechanism, which is shown in the combination block 510 as attention mechanism 516. Per the attention mechanism 516, the hidden output states of each of four child nodes 512, 538, 540, 542 of the same parent node 514 are provided to a neural network that computes a set of weights-one for each of the four children. At a high level, these weights generally indicate a strength of correlation between the hidden state of the child node and the metapath embedding of the parent node 514 (e.g., $M_O$). Stated differently, these weights indicate "how much" each associated child node influences the parent node embedding. Using these weights and the hidden state associated with each hidden weight, the attention mechanism 516 computes a weighted summation which serves as the input hidden state to the GRU used to encode the central node 514.

Stated differently, the hidden state input to the GRU operating on the central node 514 represents some combination of the hidden child states ($\hat{h}_{OO}$, $\hat{h}_{OT}$, $\hat{h}_{OR}$, $\hat{h}_{OF}$) of its children, with heavier weight being given to the state(s) that are deemed to be of most influence on (e.g., having greatest similarity to) the metapath embedding $M_O$ for the central node 514. Applying this same general logic, the GRU computes the hidden state of each internal (non-leaf) node of the tree as passes this information upward to be used as the input hidden state to the GRU encoding of the corresponding parent.

Since the tree aggregation is conducted in a bottom-up fashion, the aggregation occurs closer and closer to the root node (target node) as the process proceeds. The input-hidden attention mechanism at each level advantageously introduces an emphasis on those metapaths that contribute more and more to the target node.

The semantic tree aggregation equations can be expressed as follows:

$$r_j = \sigma\left(W_{mr}M_P + W_{hr}h_P^{j-1}\right)$$

$$z_j = \sigma\left(W_{mz}M_P + W_{hz}h_P^{j-1}\right)$$

$$n_j = \tanh\left(W_{mn}M_P + r_j \odot W_{hn}h_P^{j-1}\right)$$

$$\hat{h}_P^j = (1 - z_j) \odot n_j + z_j \odot h_P^{j-1}$$

where $M_P$ is the metapath feature of metapath P, $h_P^{j-1}$ is the input hidden state of metapath P from children at the height j−1 of the semantic tree or the initial hidden state for leaf nodes (a vector of zeros), $\hat{h}_p^j$ is the output hidden state of metapath P and $r_j$, $z_j$, $n_j$ are the reset, update, and new gates, respectively, $\sigma$ is the sigmoid function, and $\lfloor$ is the element-wise multiplication.

To calculate the input hidden state $h_P^{j-1}$ for internal (non-leaf nodes) in the semantic tree, the attention mechanism 516 selectively applies weights and combines the output hidden states of the child nodes. Specifically, let $\mathcal{P}_P^{child}$ be the set of metapaths where $\{C_Q, Q \in \mathcal{P}_P^{child}\}$ are the set of children nodes of $C_P$ in the sematic tree (where $M_P$ is the metapath embedding for node $C_P$), the weight coefficient $\alpha_Q^{j-1}$ of each output hidden state from children node $C_Q$ can be calculated as:

$$\alpha_Q^{j-1} = \frac{\exp\left(\delta\left(W_P \cdot \left[M_P \| \hat{h}_Q^{j-1}\right]\right)\right)}{\sum_{S \in \mathcal{P}_P^{child}} \exp\left(\delta\left(W_P \cdot \left[M_P \| \hat{h}_S^{j-1}\right]\right)\right)}$$

where $\delta$ is the activation function, $W_P$ is a learnable projection vector for metapath P and $\|$ stands for concatenation. Then, the hidden input state $h_P^{j-1}$ for internal tree nodes can be computed by aggregating output hidden states of children nodes as:

$$h_P^{j-1} = \delta\left(\sum_{Q \in \mathcal{P}_P^{child}} \alpha_Q^{j-1} \cdot \hat{h}_Q^{j-1}\right)$$

After the semantic tree aggregation has finished, the result is an embedding $Z_{init}$ 518. This embedding represents an initial prediction of the root node that takes into account all information encoded in the entire tree.

In the illustrated implementation, the embedding $Z_{init}$ 518 is refined by adding it to a feature residual 522 and a label residual 520 that further emphasize the initial features of the root node and labels aggregated from the metapath neighbors that have labels. The feature residual 522 is a metapath embedding generated based on the feature vector $X_{init}$ for the initial target node. In the example shown, it is assumed that the encoded semantic tree 503 is of the form shown in FIG. 4 (see encoded semantic tree 408) with label information existing only for sender nodes (e.g., corresponding to paths OT, TO, and HH). In this case, the label residual 520 is an embedding generated based on an aggregation of the labels for all sender nodes other than the root node (e.g., sender nodes corresponding to path type identifiers OT, TO, and HH). The "agg" term in the label residual 520 can, in various implementations, be mean, sum, max, min, etc.

Notably, the feature residual 522 and label residual 520 are, in FIG. 5, shown to be generated via an MLP, but MLP could be replaced with any trained neural network suitable for performing the described functionality as generally described with respect to the semantic tree encoder 404 of FIG. 4.

The above-described summation of the embedding $Z_{init}$ 518 with the feature residual 522 and the label residual 520 yields a tree embedding 524 that is also a prediction of the embedding representation of the root node.

The tree embedding 524 is input to a prediction block 530 (e.g., an output layer) that includes software components standard in other ML-based predictive systems. Specifically, the prediction block 530 includes one or more linear layers 532 that translate the tree embedding 524 to a dimension accepted as input to a select activation function 534. The activation function 534 is, for example, a sigmoid activation function or softmax activation function that translates a vector of real numbers into a probability distribution representing a final label prediction 536 for the root node of the semantic tree (e.g., the target node in the original heterogeneous graph structure).

During training of the system described with respect to FIG. 2 above (with individual components described with respect to each of FIG. 3-5), there are three sets of weights learned-a first set of weights for the neural networks that create the metapath embedding, a second set of weights learned for the sequential neural network that performs tree aggregation, and a third set of weights for the linear layer(s) 532 in the prediction block 520. The forward training phase includes tree encoding (e.g., creating metapath embeddings), followed by tree aggregation to render a label prediction. Following each label prediction, the backward phase of training commences. During this training phase, a loss function is computed. The output of the loss function generally represents a difference between the actual (known) label and the final label prediction 536. This output is propagated through the model pipeline backward such that the weights of the output layer are updated first, followed by the weights of the sequential neural network (e.g., GRU), followed by the weights for the NNs that transform the metapath embeddings. In one implementation, this propagation is handled internally by a deep learning framework (e.g., PyTorch). After each update to the three sets of weights, the process is repeated for another labeled node in the training dataset.

FIG. 6 illustrates example operations 600 for using a heterogeneous graph neural network to make predictions about heterogeneous graph data. A determining operation 602 determines a heterogeneous graph structure representing a real-world network. The heterogeneous graph structure includes multiple types of nodes. A first preprocessing operation 604 identifies, for each node in the heterogeneous graph structure, a set of node-target paths that connect the node to a target node (e.g., a node that a prediction is to be made for). A second preprocessing operation 606 assigns, to each of the node-target paths, a path type identifier indicative of a number of edges and corresponding edge types in the associated node-target path.

A third preprocessing operation 608 extracts a semantic tree from the heterogeneous graph structure. The semantic tree structure includes the target node as a root node and defines a hierarchy of metapaths. Each of the metapaths corresponds to a different subset of the node-target paths in the heterogeneous graph structure assigned to a same path type identifier.

An encoding operation 610 encodes a set of metapath embeddings with one or more neural networks (e.g., one or more trained GNNs). In one implementation, the neural networks include MLPs each trained on training data associated with a different metapath type. Collectively, the multiple MLPs form can be understood as forming a heterogeneous GNN. Each metapath embedding includes encoded aggregated feature-label data for nodes in the heterogeneous graph structure corresponding to the path type identifier associated with the metapath represented by the metapath embedding.

A label prediction operation 612 predicts a label of the target node in the heterogeneous graph structure for based on the set of metapath embeddings. According to one implementation, label prediction entails generating a tree embedding representing the semantic tree as a whole by aggregating the metapath embeddings in a bottom-up fashion The tree embedding is translated, with an output layer, into a probability distribution representing the predicted label.

Figure 7:
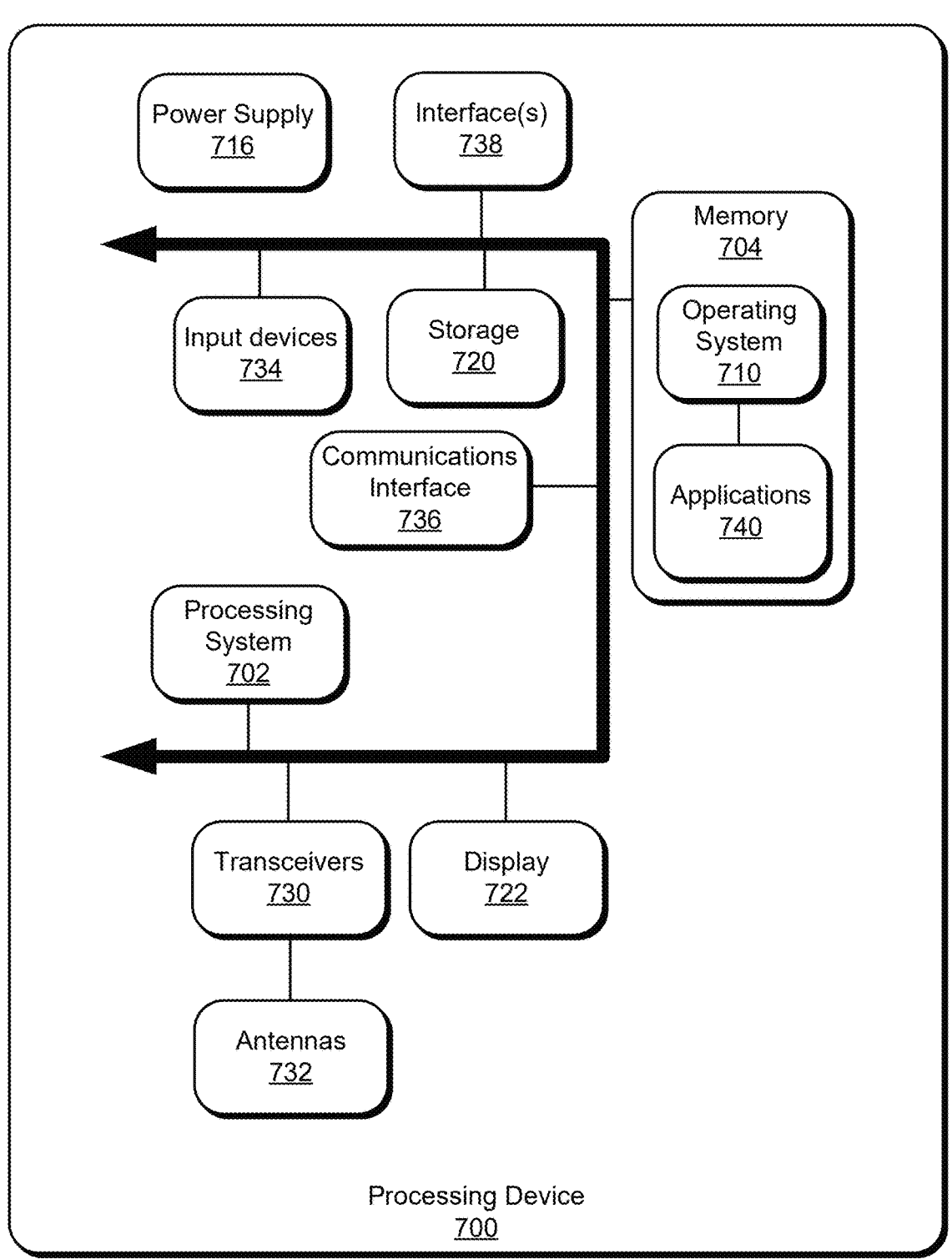
FIG. 7 illustrates an example schematic of a processing device suitable for implementing aspects of the disclosed technology.

FIG. 7 illustrates an example schematic of a processing device 700 suitable for implementing aspects of the disclosed technology. The processing devices 700 includes one or more processor unit(s) 702, memory device(s) 704, a display 706, and other interfaces 708 (e.g., buttons). The processor unit(s) 702 may each include one or more CPUs, GPUs, etc.

The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, may resides in the memory 704 and be executed by the processor unit(s) 702, although it should be understood that other operating systems may be employed.

One or more applications 712 (e.g., the label predictor 202 of FIG. 2 and all of its subcomponents) are loaded in the memory 704 and executed on the operating system 710 by the processor unit(s) 702. In some implementations, aspects of the label predictor 202 are loaded into memory of different processing devices connected across a network. The applications 712 may receive inputs from one another as well as from various input local devices such as a microphone 734, input accessory 735 (e.g., keypad, mouse, stylus, touchpad, gamepad, racing wheel, joystick), and a camera 732. Additionally, the applications 712 may receive input from one or more remote devices, such as remotely-located servers or smart devices, by communicating with such devices over a wired or wireless network using more communication transceivers 730 and an antenna 438 to provide network connectivity (e.g., a mobile phone network, Wi-Fi®, Bluetooth®). The processing device 700 may also include one or more storage devices 728 (e.g., non-volatile storage). Other configurations may also be employed.

The processing device 700 further includes a power supply 716, which is powered by one or more batteries or other power sources and which provides power to other components of the processing device 700. The power supply 716 may also be connected to an external power source (not shown) that overrides or recharges the built-in batteries or other power sources.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method disclosed herein provides for determining a heterogeneous graph structure representing a real-world network and identifying, for each node in the heterogeneous graph structure, a set of node-target paths that connect the node to a target node. The method further proves for assigning a path type identifier to each of the node-target paths. The path type identifier is indicative of a number of edges and corresponding edge types in the associated node-target path. The method further includes extracting a semantic tree from the heterogeneous graph structure. The semantic tree includes the target node as a root node and defines a hierarchy of metapaths that each individually correspond to a subset of the node-target paths in the heterogeneous graph structure assigned to a same path type identifier. The method further includes encoding, with one or more neural networks, a set of metapath embeddings corresponding to nodes of the semantic tree. Each of the metapath embeddings includes aggregated feature-label data for nodes in the heterogeneous graph structure corresponding to the path type identifier associated with the metapath embedding. The method further includes generating a label prediction for the target node in the heterogeneous graph structure for based on the set of metapath embeddings.

Another example method of any preceding method further includes generating a tree embedding by using a sequential neural network to aggregate the metapath embeddings for each of the metapaths in the semantic tree in a bottom-up fashion. In this method, generating the label prediction is based on the tree embedding.

In another example method of any preceding method, the real-world network is a communications network and the nodes in the heterogeneous graph structure include at least two types of nodes selected from a group consisting of: message senders; message recipients; domains; messages; and Internet protocol (IP) addresses.

In yet another example method of any preceding method, the method further includes defining the aggregated feature-label data for each of the metapaths. The aggregated feature-label data for each of the metapaths to include at least one of: an aggregated feature vector generated based on feature data for a subset of nodes in the heterogeneous graph structure with a node-target path characterized by a same one of the path type identifiers and a pair of vectors consisting of the aggregated feature vector and an aggregated label vector generated based on label data for the subset of nodes.

In still yet another example method of any preceding method, the one or more neural networks include multiple deep neural networks each trained based on feature and label data associated with a different one of the path type identifiers. The method further includes providing the aggregated feature-label data for each metapath as input to a select one of the multiple deep neural networks associated the metapath; receiving a metapath embedding as output from the select one of the multiple deep neural networks; and assigning the metapath embedding to a select node in the semantic tree associated with the path type identifier corresponding to the metapath.

In another example method of any preceding method, generating the label prediction for the target node in the heterogeneous graph structure further includes generating a tree embedding representing the semantic tree as a whole by aggregating the metapath embeddings in a bottom-up fashion; and translating, with an output layer, the tree embedding into a probability distribution.

In yet still another example method of any preceding method, using the sequential neural network to aggregate the metapath embeddings for each of the metapaths in the semantic tree further includes identifying with an attention mechanism for each parent node in the semantic tree, a select one of multiple child nodes depending from the parent node that shares a greatest similarity with the parent node, and computing, by the attention mechanism, a weighted summation of embeddings corresponding to each of the multiple child nodes. Here, the weighted summation applies a heavier weight to the select one of the multiple child nodes (e.g., the one sharing greatest similarity) than the other child nodes. The weighted summation is provided as input to the sequential neural network operating on a node at a next highest layer of the semantic tree.

In another example method of any preceding method, the real-world network is a communication network and the label prediction predicts whether an account associated with communication is compromised.

In another aspect, some implementations include a computer-implemented prediction system for predicting a node label (e.g., classification for the node) in heterogenous graph representing a real-world network. The computing system includes hardware logic circuitry that is configured to perform any of the methods described herein.

In yet another aspect, some implementations include a computer-readable storage medium for storing computer-readable instructions. The computer-readable instructions, when executed by one or more hardware processors, perform any of the methods described herein.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
   determining a heterogeneous graph structure representing a real-world network;
   identifying, for each node of multiple nodes in the heterogeneous graph structure, a set of node-target paths that connect the node to a target node;
   assigning, to each path of the node-target paths, a path type identifier indicative of a number of edges and corresponding edge types in the path;
   extracting a semantic tree from the heterogeneous graph structure, the semantic tree comprising the target node as a root node and defining a hierarchy of metapaths that each individually correspond to a subset of the node-target paths in the heterogeneous graph structure assigned to a same path type identifier;
   encoding, with one or more neural networks, a set of metapath embeddings corresponding to nodes of the semantic tree, each of the metapath embeddings comprising aggregated feature-label data for nodes in the heterogeneous graph structure corresponding to the path type identifier associated with the metapath represented by the metapath embedding; and generating a label prediction for the target node in the heterogeneous graph structure based on the set of metapath embeddings.

2. The method of claim 1, further comprising:

generating a tree embedding by using a sequential neural network to aggregate the metapath embeddings for each of the metapaths in the semantic tree in a bottom-up fashion, wherein generating the label prediction is based on the tree embedding.

3. The method of claim 1, wherein the real-world network is a communications network and the nodes in the heterogeneous graph structure include at least two types of nodes selected from a group consisting of:

message senders;
message recipients;
domains;
messages; and
Internet protocol (IP) addresses.

4. The method of claim 1, further comprising:

defining the aggregated feature-label data for each of the metapaths, the aggregated feature-label data for each of the metapaths comprising at least one of:

an aggregated feature vector generated based on feature data for a subset of nodes in the heterogeneous graph structure with a node-target path characterized by a same one of the path type identifiers; and a pair of vectors consisting of the aggregated feature vector and an aggregated label vector generated based on label data for the subset of nodes.

5. The method of claim 3, wherein the one or more neural networks include multiple deep neural networks each trained based on feature and label data associated with a different one of the path type identifiers, and wherein the method further includes:

providing the aggregated feature-label data for each metapath as input to a select one of the multiple deep neural networks associated the metapath;

receiving a metapath embedding as output from the select one of the multiple deep neural networks; and assigning the metapath embedding to a select node in the semantic tree associated with the path type identifier corresponding to the metapath.

6. The method of claim 1, wherein generating the label prediction for the target node in the heterogeneous graph structure further comprises:

generating a tree embedding representing the semantic tree as a whole by aggregating the metapath embeddings in a bottom-up fashion; and translating, with an output layer, the tree embedding into a probability distribution.

7. The method of claim 2, wherein using the sequential neural network to aggregate the metapath embeddings for each of the metapaths in the semantic tree further comprises:

for each parent node in the semantic tree:

identifying, with an attention mechanism, a select one of multiple child nodes depending from the parent node that shares a greatest similarity with the parent node;

computing, by the attention mechanism, a weighted summation of embeddings corresponding to each of the multiple child nodes, the weighted summation applying a heavier weight to the select one of the multiple child nodes than the other child nodes; and providing the weighted summation as input to the sequential neural network operating on a node at a next highest layer of the semantic tree.

8. The method of claim 1, wherein the real-world network is a communication network and the label prediction predicts whether an account associated with communication is compromised.

9. A system comprising:

a processor;
memory;
a label predictor stored in the memory and executable by the processor to:

receive as input a heterogeneous graph structure that represents a real-world network;

identify, for each node of multiple nodes in the heterogeneous graph structure, a set of node-target paths that connect the node to a target node;

assign, to each path of the node-target paths identified for each node, a path type identifier indicative of a number of edges and corresponding edge types in the path;

extract a semantic tree from the heterogeneous graph structure, the semantic tree comprising the target node as a root node and defining a hierarchy of metapaths that each individually correspond to a subset of the node-target paths in the heterogeneous graph structure assigned to a same path type identifier;

encode, with one or more neural networks, a set of metapath embeddings corresponding to nodes of the semantic tree, each of the metapath embeddings comprising aggregated feature-label data for nodes in the heterogeneous graph structure corresponding to the path type identifier associated with the metapath represented by the metapath embedding; and generate a label prediction for the target node in the heterogeneous graph structure based on the set of metapath embeddings.

10. The system of claim 9, wherein the label predictor is further configured to:

generate a tree embedding by using a sequential neural network to aggregate the metapath embeddings for each of the metapaths in the semantic tree in a bottom-up fashion, wherein generating the label prediction is based on the tree embedding.

11. The system of claim 9, wherein the real-world network is a communications network and the nodes in the heterogeneous graph structure include at least two types of nodes selected from a group consisting of:

message senders;
message recipients;
domains;
messages; and
Internet protocol (IP) addresses.

12. The system of claim 9, wherein the label predictor is further configured to:

generate the aggregated feature-label data for each of the metapaths, the aggregated feature-label data for each of the metapaths comprising at least one of:

an aggregated feature vector generated based on feature data for a subset of nodes in the heterogeneous graph structure with a node-target path characterized by a same one of the path type identifiers; and a pair of vectors consisting of the aggregated feature vector and an aggregated label vector generated based on label data for the subset of nodes.

13. The system of claim 9, wherein the one or more neural networks include a multiple deep neural networks each trained based on feature and label data associated with a different one of the path type identifiers, and wherein the label predictor is further configured to:

provide the aggregated feature-label data for each meta-path as input to a select one of the multiple deep neural networks associated the metapath;

receive a metapath embedding as output from the select one of the multiple deep neural networks; and assign the metapath embedding to a select node in the semantic tree associated with the path type identifier corresponding to the metapath.

14. The system of claim 9, wherein the label predictor generates the label prediction for the target node by:

generating a tree embedding representing the semantic tree as a whole by aggregating the metapath embeddings in a bottom-up fashion; and translating, with an output layer, the tree embedding into a probability distribution.

15. The system of claim 10, wherein using the sequential neural network to aggregate the the metapath embeddings for each of the metapaths in the semantic tree further comprises:

for each parent node in the semantic tree:

identifying, with an attention mechanism, a select one of multiple child nodes depending from the parent node that shares a greatest similarity with the parent node;

computing, by the attention mechanism, a weighted summation of embeddings corresponding to each of the multiple child nodes, the weighted summation applying a heavier weight to the select one of the multiple child nodes than the other child nodes; and providing the weighted summation as input to the sequential neural network operating on a node at a next highest layer of the semantic tree.

16. The system of claim 10, wherein the real-world network is a communication network and the label prediction predicts whether an account associated with a communication is compromised.

17. A tangible computer-readable storage media encoding computer-executable instructions for executing a computer process, the computer process comprising:

determining a heterogeneous graph structure representing a real-world network;

identifying, for each node of multiple nodes in the heterogeneous graph structure, a set of node-target paths that connect the node to a target node;

assigning, to each path of the node-target paths, a path type identifier indicative of a number of edges and corresponding edge types in the path;

extracting a semantic tree from the heterogeneous graph structure, the semantic tree comprising the target node as a root node and defining a hierarchy of metapaths that each individually correspond to a subset of the node-target paths in the heterogeneous graph structure assigned to a same path type identifier;

encoding, with one or more neural networks, a set of metapath embeddings corresponding to nodes of the semantic tree, each of the metapath embeddings comprising aggregated feature-label data for nodes in the heterogeneous graph structure corresponding to the path type identifier associated with the metapath represented by the metapath embedding; and predicting a label of the target node in the heterogeneous graph structure based on the set of metapath embeddings.

18. The tangible computer-readable storage media of claim 17, wherein the computer process further comprises:

generating a tree embedding by using a sequential neural network to aggregate the metapath embeddings for each of the metapaths in the semantic tree in a bottom-up fashion, wherein generating the label prediction is based on the tree embedding.

19. The tangible computer-readable storage media of claim 17, wherein the real-world network is a communications network and the nodes in the heterogeneous graph structure include at least two types of nodes selected from a group consisting of:

message senders;

message recipients;

domains;

messages; and

Internet protocol (IP) addresses.

20. The tangible computer-readable storage media of claim 19, wherein the label prediction predicts whether an account associated with a communication is compromised.

* * * * *